US 6,567,854 B1

(12) United States Patent
Olshansky et al.

(10) Patent No.: US 6,567,854 B1
(45) Date of Patent: May 20, 2003

(54) INTERNET SERVICE DELIVERY VIA SERVER PUSHED PERSONALIZED ADVERTISING DASHBOARD

(75) Inventors: Robert Olshansky, Wayland, MA (US); Steven Richard Winnett, Brookline, MA (US)

(73) Assignees: Genuity Inc., Cambridge, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/422,540

(22) Filed: Oct. 21, 1999

(51) Int. Cl.[7] ............................................... G06F 15/16
(52) U.S. Cl. ....................... 709/229; 709/204; 709/225; 709/226; 705/14
(58) Field of Search ..................... 379/100.13; 709/228, 709/224, 223, 227, 204, 225, 226, 229; 705/14

(56) References Cited

U.S. PATENT DOCUMENTS

| | | | | |
|---|---|---|---|---|
| 5,893,091 A | * | 4/1999 | Hunt et al. ................... 707/10 |
| 5,974,398 A | * | 10/1999 | Hanson et al. ............. 379/88.2 |
| 6,212,554 B1 | * | 4/2001 | Roskowski ................. 709/203 |
| 6,237,022 B1 | * | 5/2001 | Bruck et al. ................ 709/200 |

* cited by examiner

Primary Examiner—Saleh Najjar
(74) Attorney, Agent, or Firm—Leonard Charles Suchyta; James K. Weixel

(57) ABSTRACT

A communication service with a computer application is presented. The application provides an advertising dashboard to a subscriber engaged in a session of a service. The advertising dashboard includes an advertisement. The advertising dashboard may also include personalized information such as hotlinks to customized web pages.

33 Claims, 7 Drawing Sheets

US 6,567,854 B1

INTERNET SERVICE DELIVERY VIA SERVER PUSHED PERSONALIZED ADVERTISING DASHBOARD

BACKGROUND OF THE INVENTION

1. Field of the Invention

This application relates to communication and advertising, and more particularly, to service delivery via a server pushed personalized advertising dashboard.

2. Description of Related Art

There are many Internet services available to consumers for a fee. Examples include Internet subscriptions to magazines, Internet Call Manager™ (ICM), which manages incoming calls, and Internet access itself.

Various businesses associated with such services have attempted to defray the fee they charge to customers by generating revenues from advertisements placed on Web pages. Typically, advertisements on the Internet today are generally "browser-based" and "pulled." This latter term "pulled" refers to advertisements that appear on a screen as a consequence of an action taken by the subscriber. For example, upon visiting a particular browser, Yahoo™ for example, the subscriber may be greeted by an advertisement banner whose contents are selected or approved In such case, the banner is pulled by the subscriber because it appears as a consequence of a user's action such as visiting the Yahoo site.

The particular message that is currently delivered to the subscriber when visiting a Web site may depend on one of three methods for such delivery. First, a particular advertisement may arise as a consequence of a search that the subscriber performed. For example, if the subscriber uses Yahoo to search for automobiles, a banner displaying a specific automobile model may be displayed. A second method is known as channel advertisement. Here, the advertisement displayed depends on the particular page of a Web site a subscriber is on. For example, going to a travel page of Yahoo may result in a specific airline to be displayed in a banner. Finally, there may just be some rotation of advertising banners irrespective of what searches are made or what page is visited. Nonetheless, this type of advertising method is still pulled because it arises as a consequence of a subscriber visiting a certain Web site.

In addition, the advertising is context-dependent. I.e., the user utilizes a browser and a particular Internet portal with that browser.

Messages may alternatively be "pushed" to a computer screen. Pushed messages are displayed as a consequence of a server directive that is unbidden by the subscriber. Internet Call Manager (ICM) is an example of a service that pushes messages. Because one specific embodiment of the present invention elaborated upon below may appear in conjunction with the ICM, this Manager is discussed here by way of background.

A subscriber establishes computer dialogue with a data communications service (DCS) via a dial-up connection using a telephone link connected to the Public Switched Telephone Network (PSTN). Two methods for connecting to a DCS include a temporary dial up modem connection over the PSTN, or a dedicated connection either through the PSTN or through a private telephone connection. For a temporary dial up modem connection over the PSTN, the telephone link is held in an off hook state. The use of a telephone line for a data call requires the exclusive use of the line. Fortunately, there exist several enhanced IP services, such as Internet Call Manager (ICM) or Unified Messaging (UM), that alert a subscriber to an event such as an incoming call or message by pushing a pop-up screen on the user's PC. The pop-up screen may have disposition options (e.g., incoming call from xxx, do you wish to: ignore, reply, answer) or a simple alert (e.g., "you have voice mail").

As notification pop-ups, these screens may attract the attention of the subscriber. Accordingly, the appearance of the pop-up screen affords the service provider with an opportunity to provide an additional customized service to the subscriber, and creates an advertisement-based revenue-generating opportunity for the service provider based on the sale of banner advertisements. If the advertisement revenue is sufficient, the service can be offered for free or at a reduced price.

Another pushed method of conveying messages involves a "ticker tape." Such a tape or strip is a message which, instead of "popping-up" at various times, runs continuously across the screen at a certain Web site. The information in the ticker tape may be personalized. For example, the subscriber may choose to display the value of the Dow Jones in the ticker tape. Typically, the tape contains no advertisement.

The types of notification messages with banner advertisements described above are lacking in so far as none is simultaneously browser-independent, pushed to the subscriber via an asynchronous interrupt (unlike a continuous message, which begins near the start of a session and ends near the end, a message delivered by an asynchronous interrupt has varying start and end times), and highly targeted by using personal information of the subscriber.

SUMMARY OF THE INVENTION

A communication service delivering messages to subscribers logged onto, for example, the Internet is presented. Such messages contain banner advertisements, and are pushed to the subscriber as an interrupt or pop-up. Moreover, the messages may be highly targeted to the subscriber by making use of such information as the subscriber's identity, location, phone number, personal interests, and habits.

The subscriber need not be utilizing a browser to receive a dashboard message. During any Internet activity, such as processing email, and playing games, the message may be delivered to the subscriber. These messages represent unbidden interrupts, but are rendered more palatable to the subscriber in at least two ways. First, the messages can contain personalized messages, and hotlinks to subscriber-selected sites; the personalized messages might include information that the subscriber deems to be useful, such as a stock quote, or a sports score. Second, the cost to the subscriber of some Internet service is defrayed by the advertising present in the messages.

A communication service with a computer application, for example, is presented that utilizes a pop-up notification box. The notification box alerts a subscriber to a messaging event such as an incoming call or message. In addition, the pop-up screen contains a dashboard with personalized information and/or hotlinks to customized web pages for items such as stocks, weather, sports, news, local interests, travel, shopping, and games. The linked web pages provide the subscriber with a customer designed service (e.g., latest quotes on selected stocks and regional weather reports), but also contain banner advertisements, personalized messages, and hotlinks to other web sites. The advertising dashboard thus provides a customized service to the subscriber, and a revenue generating opportunity to the service provider through sales of banner advertisements and hotlinks. The pop-up notification box itself can display banner advertisements which are downloaded to the client prior to the call event.

More specifically, a method of defraying a cost of an Internet service provided to a subscriber is presented comprising providing a dashboard server that is connected to a computer of the subscriber; pushing an advertising dashboard from the dashboard server to a display of the computer by interrupting an Internet session on the computer, and by using data provided by the dashboard server; on the advertising dashboard, providing information to the subscriber; and to defray the cost of the Internet service, providing an advertisement on the advertising dashboard.

Providing information includes providing a hotlink to a web page, where the web page may include one of a stocks site, weather site, sports site, news site, travel site, local information site, shopping site, and games site. The web page may also include at least one of an advertisement banner and a link to another web page. The information may involve weather, stocks, sports, news, and personalized information that is preselected by the subscriber.

The method may further include obtaining personal data from the subscriber; and to defray the cost of the Internet service, providing an advertisement on the advertising dashboard that is targeted according to the personal data. Personal data may relate to at least one of education, salary, sex, and address of the subscriber.

The method may also include storing data for the advertising dashboard in a cache on the computer, and downloading data for the dashboard to the computer as soon as the subscriber is engaged in an Internet session on the computer.

A system is also presented for defraying a cost of an Internet service provided to a subscriber comprising a dashboard server connected to a computer of the subscriber; instructions for the server and computer for pushing the advertising dashboard to a display of the computer by interrupting an Internet session; a hotlink to a web page displayed on the advertising dashboard; and to defray the cost of the Internet service, an advertisement displayed on the advertising dashboard.

In a public switched telephone network providing telephone link blocked call redirection, also presented below is a method permitting notification and control of redirected calls, and delivery of an advertising dashboard over a data communications network, the method comprising using a telephone link, with an associated dial number, to connect a computer to a data communications service (DCS) via the data communications network to permit a subscriber to engage in a session with the DCS; receiving a unique data network address from the DCS; establishing a data path over the data network to a subscriber proxy having a dashboard server; using the data path to provide the proxy with a message including the unique data network address; receiving a call waiting message at the computer corresponding to a telephone call to the dial number; processing the call waiting message to produce an output perceptible by the subscriber; and pushing the advertising dashboard to a display of the computer by using data provided by the dashboard server. The method may also include storing data for the advertising dashboard in a cache on the computer. The call waiting message may include caller identification information involving calling line identification information.

Pushing an advertising dashboard may include interrupting the DCS with a pop-up message, which may have a banner advertisement, or a hotlink to a customized web page. The web page may be a stocks site, weather site, sports site, news site, or games site, and may have an advertisement banner and a link to another web page.

In a public switched telephone network (PSTN) providing telephone link blocked call redirection, a method is also presented permitting notification and control of redirected calls, and delivery of an advertising dashboard over a data communications network, the method comprising receiving a message over the data communications network containing a unique data network address; storing a subscriber dial number and the unique data network address; receiving a telephone call forwarded by the PSTN; obtaining dialed number information from the PSTN. The method further includes comparing the dialed number information to stored subscriber dial number information; for matching number information, providing a call waiting message to the data network addressed to the unique data network address corresponding to the dialed number information; receiving caller identification information from the PSTN; including the caller identification information in the call waiting message; and pushing the advertising dashboard by using the data delivered to said unique data network address, over said data communications network. The method may further include periodically transmitting messages to the unique data network address requesting a reply for confirmation of the presence of a computer at the unique data network address.

Pushing an advertising dashboard may include causing a pop-up message to appear on a display of a computer corresponding to the unique data network address, and causing a pop-up message having a banner advertisement, or a hotlink to a customized web page to appear on a display of a computer corresponding to the unique data network address.

In a public switched telephone network (PSTN) providing telephone link blocked call redirection, a method is also presented below permitting notification and control of redirected calls, and delivery of data for an advertising dashboard over a data communications network, the method comprising activating blocked call forwarding for a subscriber telephone link having a subscriber dial number associated therewith; providing a second dial number corresponding to a subscriber proxy for redirection of blocked calls to the subscriber telephone link, the proxy having a dashboard server; using the telephone link to connect a computer to a data communications service (DCS) via the data communications network to permit a subscriber to engage in a session with the DCS; receiving a unique data network address from the DCS. The method further includes establishing a data path over the data network to the subscriber proxy and providing the proxy with the subscriber dial number and the unique data network address; receiving a blocked call forwarded by the PSTN to the second dial number; obtaining dialed number information from the PSTN; comparing the dialed number information to stored subscriber dial number information; for matching number information, providing a call waiting message to the data network addressed to the unique data network address corresponding to the dialed number information; receiving the call waiting message at the computer; the computer processing the call waiting message to produce an output perceptible by the subscriber; and pushing the advertising dashboard to a display of the computer.

Pushing an advertising dashboard includes interrupting the session with a pop-up message, which may have a banner advertisement, or a hotlink to a web site.

The method may allow the proxy to receive caller identification information from the PSTN and includes the caller identification information in the call waiting message. The output may comprise messages visually perceptible on a video display connected to the computer, or audible sounds.

A system for alerting a subscriber, engaged in an Internet session via a telephone line, to a telephone call incoming on the line, and for delivering an advertising dashboard to the subscriber is also presented below. The system includes means for receiving a message over a data network including a subscriber dial number and a unique data network address associated with the telephone; means for storing the subscriber dial number and the unique data network address; means for receiving the telephone call forwarded by a public switched telephone network; means for obtaining dialed number information from the public switched telephone network; means for comparing the dialed number information to stored subscriber dial number information; means for, for matching number information, providing a call waiting message to the data network addressed to the unique data network address corresponding to the dialed number information; and means for pushing the advertising dashboard to the subscriber using data delivered over said data network to said unique data network address.

Also presented below, is a method of advertising on an Internet including providing a dashboard server that is connected to a computer of a subscriber. While the subscriber is engaged in an Internet session on the computer, the method may further include pushing an advertising dashboard to a display of the computer by interrupting the Internet session; on the advertising dashboard, providing information to the subscriber; and providing an advertisement on the advertising dashboard.

Providing information may include providing a hotlink to a web page. The web page may be a stocks site, weather site, sports site, news site, travel site, local information site, shopping site, and games site. The web page may include at least one of an advertisement banner and a link to another web page. Providing information may also include providing information relating to at least one of weather, stocks, sports, local interest, shopping, travel, news, and personalized information relating to a topic that is preselected by the subscriber.

The method may further include obtaining personal data from the subscriber; and providing an advertisement on the advertising dashboard that is targeted to the subscriber according to the personal data. Personal data may include at least one of education, salary, sex, and address of the subscriber. The method may further comprising storing the advertising dashboard in a cache on the computer. Pushing an advertising dashboard may involve downloading the dashboard to the computer as soon as the subscriber is engaged in an Internet session on the computer.

Also presented below is a system for advertising on an Internet comprising a dashboard server connected to a computer of the subscriber; instructions for the server for delivering data to the computer for an advertising dashboard pushed to the subscriber by interrupting an Internet session; a hotlink to a web page displayed on the advertising dashboard; and an advertisement displayed on the advertising dashboard.

Presented below is also a method of defraying a cost of a service provided to a subscriber, the service capable of delivering a message to the subscriber via a communicator, comprising providing a dashboard server that is connected to the communicator; while the subscriber is engaged in a session of the service, pushing an advertising dashboard to the communicator by interrupting the session; and to defray the cost of the service, providing an advertisement on the advertising dashboard, wherein the advertisement is targeted to the subscriber by using personal information supplied by the subscriber. The advertising dashboard may include information related to a topic preselected by the subscriber. The communicator may be a television, or a computer, for example.

Also presented below is a system for advertising directed to a subscriber engaged in a session of a service comprising a communicator for delivering a message to the subscriber; a dashboard server connected to the communicator; machine executable instructions for the server for delivering data to the communicator for an advertising dashboard pushed to the subscriber by interrupting the session; and an advertisement displayed on the advertising dashboard, wherein the advertisement is targeted to the subscriber by using personal information supplied by the subscriber. The advertising dashboard may include information related to a topic preselected by the subscriber.

Finally, a server is presented below for pushing an advertising dashboard to a subscriber by an asynchronous interrupt comprising a connector for connecting the server to a communicator, the communicator capable of delivering a message to the subscriber; machine-executable instructions for the server for selecting the advertising dashboard, the advertising dashboard including an advertisement that is targeted to the subscriber by utilizing personal information of the subscriber; and machine-executable instructions for said server for selecting data for the advertising dashboard, said advertising dashboard including an advertisement that is targeted to the subscriber by utilizing personal information of the subscriber; and machine-executable instructions for the server permitting the advertising dashboard to be pushed to the subscriber via the communicator. The communicator may be a computer or television, for example

BRIEF DESCRIPTION OF DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE PREFERRED EMBODIMENT(S)

Figure 1:
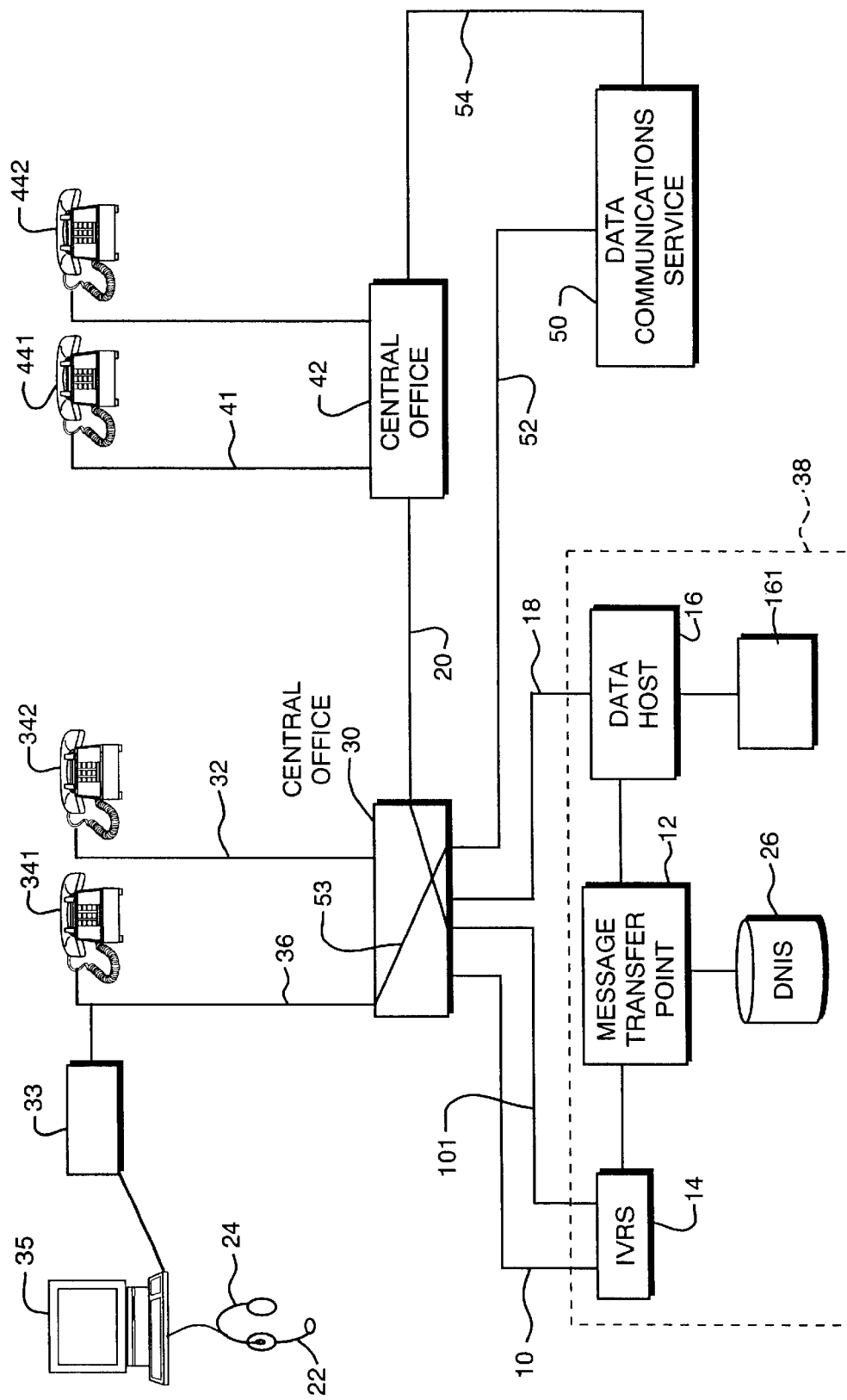
FIG. 1 is an example of a schematic block diagram illustrating the physical components and telecommunications network that are used to support the preferred methods and processes of the present invention dealing with an Internet Call Manager.

In return for supplying some personal information and tolerating banner advertisements, subscribers may be given discounts to services, such as the Internet. To make them more attractive to Internet users, information useful to the subscriber may accompany the advertisements in a pop-up box, i.e., as an interrupt of the Internet service. By an interrupt is meant here, for example, an asynchronous interrupt. Unlike a continuous message, which begins near the start of a session and ends near the end, a message delivered by an asynchronous interrupt has varying start and end times. The pop-up box or interrupt is a message that may appear suddenly during a session, and then may disappear after about a minute, for example. The notification pop-up can be designed so that the subscriber can easily add dashboard or display buttons, such as stocks, weather, news, sports, games, chat, and local events. Each button may provide a hotlink to a web page where the subscriber can customize an informational display. Depending on the amount of advertisement revenue generated from the banner advertisements, the Internet service may be provided at substantially reduced fees, or even for free. Internet services presented to the consumer for a price may be used within the embodiment of the present invention. Examples of such services include Internet subscriptions to magazines, Internet Call Manager, real time stock quotes and analysis, and Internet access itself.

The pop-up messages including banner advertisements are pushed to the subscriber. That is, they are delivered suddenly to the subscriber independently of any specific action taken by him or her. For example, while reading an online magazine, the pop-up box may be pushed to the subscriber at times that are not dictated by the subscriber's actions.

Because in return for obtaining the Internet service at a reduced price the subscriber may have to agree to provide some personal information, the banner advertisements can be targeted and personalized. Such personal information can include the telephone number, age, sex, salary, education, and address of the subscriber. The information may be supplied at the time the user subscribes to the Internet service. This information is useful to advertisers because they can target specific demographic groups in their advertisements. The advertisements themselves may contain personalized information, such as events occurring at the subscriber's alma mater, or neighborhood, for example. The salaries and education of the subscriber might dictate the particular product displayed by advertisers. In another example, political advertisements can be targeted by the geographical location of the subscriber's home.

In order to ensure that an advertising dashboard is promptly delivered to the subscriber, the advertisement may be stored in a small fast memory, or cache, as soon as the subscriber starts using the service. The cache is designed to speed up the delivery of the advertisement, and thus prevents the subscriber from closing the pop-up box before the message is delivered. The cache may be applied to processor-memory access, and also used for a local copy of data accessible over a network. If data pertaining to the advertising dashboard is read from, or written to, main memory a copy is also saved in the cache, along with the associated main memory address. The cache may monitor addresses of subsequent display requests to see if the required data is already in the cache. If it is (a cache hit), then the information contained in the cache pertaining to the advertising dashboard may be returned immediately. The cache may be built from faster memory chips than main memory so a cache hit may take much less time to complete than a normal memory access. The cache used to store information pertaining to the advertising dashboard may be located on the same integrated circuit as the CPU, in order to further reduce the access time.

The notification pop-up may be designed so that the subscriber can easily add dashboard buttons such as stocks, weather, news, sports, games, chat, and local events. Each button may provide a hotlink to a web page where the subscriber can customize an informational display.

Stocks may display most recent quotes of selected stock, Dow Jones, etc. Weather may display regional weather and forecast, weather maps, etc. News may provide headline news or news filtered according to subscriber designed rules. Chat may provide links to favorite chat rooms. Games may provide links to favorite game sites.

Each button provides a link to a customized web page providing information which the subscriber has customized. These web pages are designed by the service provider to display the customized information and to display banner advertisements and hotlinks to other web sites. The banner advertisements and hotlinks provide a new revenue generating opportunity for the carrier.

As another embodiment of the invention, the notification window may contain advertisements and hotlinks to vendor web sites. By selling advertising space on the notification window to retailers or sales channels, the advertising dashboard may provide a vehicle for a service provider such as an Internet service provider to offer a new service like Internet Call Manager (ICM) or Unified Messaging (UM) for free or at a reduced price to its subscriber base. Thus the ISP may pay the ICM or UM provider a certain amount per subscriber in return for providing the ICM and/or UM services. The ISP may cover its costs through the advertising banners which may be displayed whenever ICM or UM generate a screen pop on the subscriber's PC.

As a specific embodiment, a detailed description of the invention in connection with providing Internet Call Manager (ICM) to a subscriber is now provided.

FIG. 1 illustrates a telecommunications system including local exchange central offices 30 and 42 connected by a trunk 20. The central offices 30 and 42 support a plurality of subscribers, each subscriber having a telephone link associated with telephones 341, 342, 441, 442. Such links are shown at 32, 36 and 41. Modem 33, connected to a subscriber's computer 35, is also in communication with the central office over telephone link 36. The subscriber's computer 35 may be configured to include a voice audio input path, such as a microphone 22, and voice audio output path, such as headphones 24. The central offices 30 and 42 also support dedicated communications channels such as 18 and 54. The central offices 30 and 42 may consist, for example, of telecommunications switches, such as a Northern Telecom DMS-100™ or AT&T 5ESS™ switch. An Interactive Voice Response System (IVRS) 14 is coupled to central office switch 30 through telephone link 10. The IVRS includes audio playback and record capabilities permitting recorded voice messages to be delivered to a caller's telephone 441 and to collect and store touch-tone entries made by callers using such telephones. The data host (DH) 16, message transfer point (MTP) 12, FVRS 14, and Dialed Number Identification Service (DNIS) 26 form part of a subscriber or called party proxy 38.

The switch of central office 30 is connected to the IVRS 14 by telephone link 10. The telephone link 10 has an associated signaling channel 101. The signaling channel 101 is provided to communicate the called number to the IVRS 14 to enable the IVRS 14 to customize the interaction it has to relate to the subscriber line that the call was transferred from.

There are several options for delivery of the called number to the IVRS. The called number information may be delivered during call setup by way of the Integrated Services Digital Network call setup signaling. For the Plain Old Telephone System (POTS) telephone or centrex, the called number information may be provided using the Simplified Message Desk Interface (SMDI). Other options are available using the Advanced Intelligent Network interface. Any of these options may be advantageously employed by one skilled in the art to obtain delivery of the called number to carry out the process of the present invention.

The switch of central office 30 is also connected to the DH 16 by dedicated communications channel 18 and to the Data Communications Service (DCS) 50 over telephone link 52. The switch of central office 42 is connected to the DCS by dedicated communications channel 54.

The DH 16 is also connected to a dashboard server 161. The dashboard server 161 provides data for producing the advertising dashboard displayed to the subscriber. These data may include information for hotlinks and personalized messages. The dashboard server 161 may be any IP-ready device server with one or more Ethernet interfaces. The dashboard server 161 may have a constant connection to the Internet via an asymmetric digital subscriber line (ADSL), a form of digital line in which the bandwidth available for downstream connection is significantly larger then for upstream. Although designed to minimize the effect of crosstalk between the upstream and downstream channels, an ADSL setup may be well suited to client-server applications. The dashboard server 161 may run Unix, NT, or Linux with a Pentium II+ processor or equivalent. The server 161 may have 128 megabytes of memory, and 6 gigabytes of storage.

The dashboard server 161 provides data to display the advertising dashboard on the subscriber's computer 35. The dashboard server has software that helps in the recognition of an acknowledgment message from the subscriber's computer 35, and in the storing, downloading, and selecting of information for the advertising dashboard. In a preferred embodiment, data for the advertising dashboard is stored in the server 161. Alternatively, data for the advertising dashboard may be stored off-site in another computer connected to the server 161. An example of such an off-site computer is one that is stored on the premises of the advertiser whose advertisements may appear on the dashboard.

Software on the subscriber's computer 35 for controlling the advertising dashboard may interface with the software on the subscriber's computer 35 for controlling an Internet service, such as Internet Call Manager, with the help of Application Program Interface (API). This interface (calling conventions) involves ways by which an application program accesses operating system and other services. An API may be defined at source code level and provides a level of abstraction between the application and the kernel (or other privileged utilities) to augment the portability of the code. An API may also provide an interface between a high level language and lower level utilities and services, which may be written without consideration for the calling conventions supported by compiled languages. In this case, the main task of the API may be the translation of parameter lists from one format to another and the interpretation of call-by-value and call-by-reference arguments in one or both directions.

In a preferred embodiment, transmission control protocol (TCP) is used to transmit information for the advertising dashboard. Alternatively, any protocol providing reliable communication, flow-control, multiplexing and connection-oriented communication may be used.

The subscriber software executing on the subscriber's computer 35 may be a client application interacting with a server application on the dashboard server 161 forming a client-server software application as known to those of ordinary skill in the art. The client application and the server application may be written in one of a variety of commercially available programming languages, such as "C" or "C++." Generally, the programming language in a preferred embodiment is an executable language, such as "C" or "C++," for execution performance reasons. This is in contrast to an interpretive language, such as Java. Other embodiments may implement the client and server applications in other languages in accordance with other the objectives of each embodiment.

The dashboard server may transmit to the subscriber's computer all or part of the data for the advertising dashboard. The subscriber's computer, directed by software therein, may also provide all or part of the data for the advertising dashboard. For example, software on the subscriber's computer may provide a part of an advertising dashboard that includes the boundary, color, fields, and overall geometry of the advertising dashboard; the dashboard server may provide complimentary data for the advertising dashboard, such as the contents of a field within the dashboard used to display advertisements on the dashboard. Alternatively, the dashboard server may provide data pertaining to a subject matter, such as weather, sports scores, travel and local information, preselected by the subscriber, and appearing in fields in the advertising dashboard.

In one embodiment, the function of the computer of the subscriber and the dashboard server may be consolidated. In which case, the computer of the subscriber and the dashboard server may coincide, and share the same processors.

An MTP 12 is directly connected to the IVRS 14 and the DH 16 and functions as an intermediary by translating and transferring messages between the DH 16 and the IVRS 14. The MTP 12 accesses subscriber records from customer record file 26 which contains records for subscribers that are authorized to use the service. In addition, each subscriber's DNIS record contains real-time subscriber information relating to the status of the subscriber's telephone link (for example, link 36). Each subscriber link has a real-time record stored in the data store accessed by the MTP 12 so in the event a message or call is received by the IVRS 14 the MTP 12 can control the manner in which the IVRS 14 processes the message or call according to the status of the subscriber telephone link 36.

DH 16 is a computer host with a dedicated communications link to the DCS 50 through the switch of central office 30 which is coupled to the switch of central office 42 which has a dedicated communications channel 54 to the DCS. The dedicated link allows the DH and the DCS to communicate by providing a continuous communications path.

The DCS, through a data channel such as telephone link 52, also allows a subscriber using a dial-up data channel such as telephone link 36 to establish temporary dial-up data connections to the DCS 50, over the PSTN.

Figure 2:
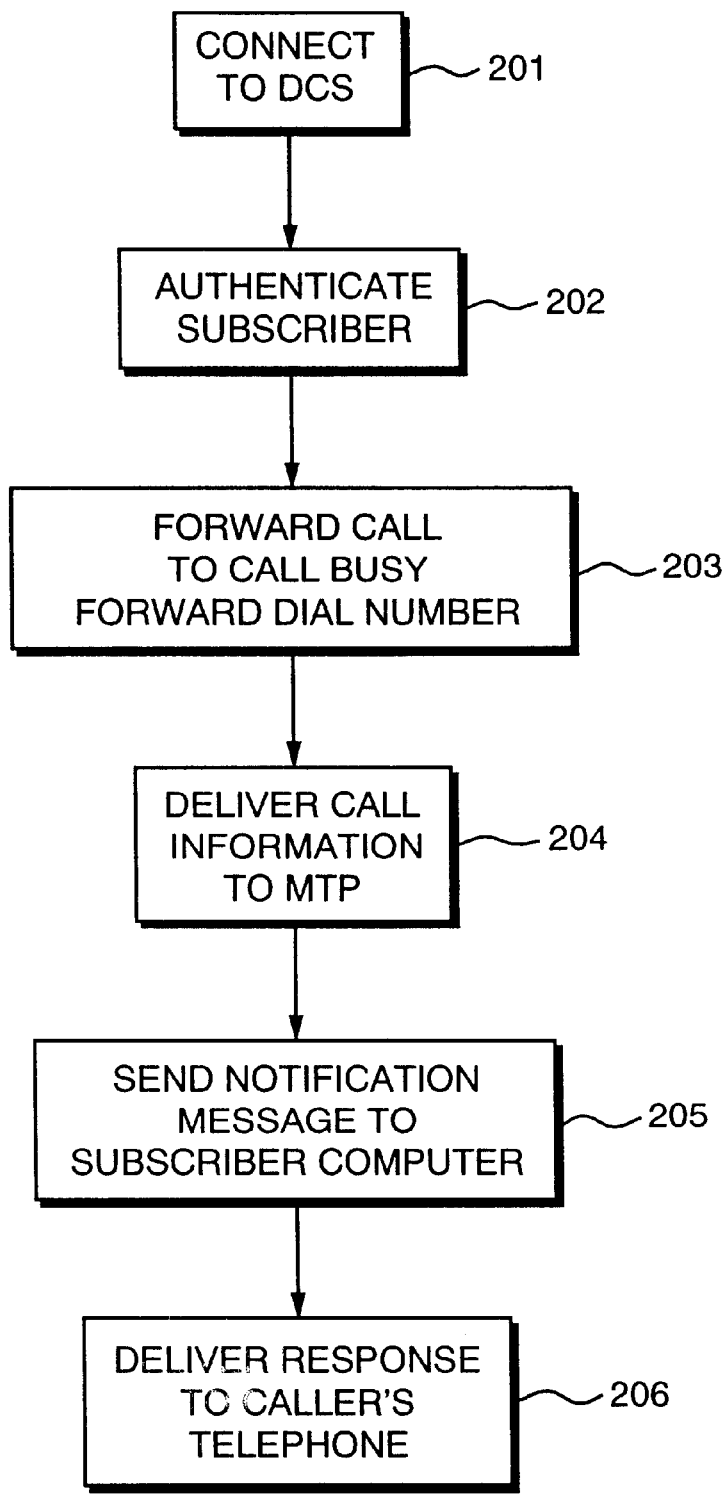
FIG. 2 is an example of a flow chart indicating the steps in the delivery of a call notification message with an advertising dashboard.

FIG. 2 is an example of a flow chart indicating the steps in the delivery of a call notification message with an advertising dashboard. In step 201, a subscriber connects to a data communication service (DCS) 50, such as that provided by an Internet Service Provider (ISP) or Commercial Online Service (COS). The subscriber, using a computer 35, modem 33 and a telephone link 36 connected to the PSTN, connects to the DCS 50 which is connected to the public switched telephone network through central office or CO 30, by dialing a predetermined dial number (DN). The subscriber initiates a modem 33 call to the DCS 50 by instructing the computer 35 to dial a predetermined DN. The subscriber's local central office (CO) 30 routes the call to the DN of the DCS 50 service point over a telephone link 52 which connects the DCS 50 to the CO 30. The DCS 50 responds by accepting the call thereby establishing a circuit 53 through CO 30. The modem 33 and computer 35 of the subscriber and the DCS 50 negotiate a connection protocol and speed over a circuit 53 bridging the subscriber telephone link 36 and a telephone link 52 of the DCS 50. Upon successful establishment of the connection protocol and speed over circuit 53, the subscriber is requested to enter user identification and password information into the computer 35 which is communicated to DCS 50. Upon entry of such information, the DCS 50 authenticates the computer 35 of the subscriber and if successful, the subscriber computer 35 is granted access to the DCS 50. Immediately upon authentication of the subscriber provided information, the access granted over the data connection is assigned either an Internet Protocol (IP) address or other type of alphanumeric network address identifier as so chosen by the DCS 50. A numerical address identifier of either form is used to achieve successful routing of information between the subscriber's computer 35 and the DCS 50. The subscriber's computer 35 transmits through the modem 33, by way of the circuit 53, to the DCS 50 host by way of the dedicated communications channel 54 a message to the DH 16 located near the MTP 12, indicating that the subscriber's computer 35 has successfully initiated a connection to the DCS 50. The message may contain a subscriber identifier assigned the DCS in addition to the subscriber's network address as assigned by the DCS 50.

In step 202, the DH 16 transmits a message to the MTP 12 where it is authenticated against an existing customer record file 26. If the subscriber identifier is found in the customer record file 26 at the MTP 12, a message is transmitted via the DCS 50 to the subscriber computer 35 indicating that subscriber information was received and authenticated successfully.

In step 203, in the event a telephone call is attempted to the DN of the telephone link 36 of the subscriber, forwarding of the call occurs. This step is initiated by the CO 30 serving that DN. The CO 30 prepares to forward the call to call busy forward dial number of the IVRS 14 by way of the PSTN. The CO 30 delivers, over signaling channel 101, information about the original destination of the call through a DNIS. The CO 30 may also deliver information identifying the origin of the call through a service known as Automatic Number Identification (ANI). Both DNIS and ANI are well known and are not described here. Upon reception of DNIS and any supplied ANI information, and prior to the IVRS 14 accepting the call, IVRS validates the DNIS information against the subscriber records located in the customer record file 26 of the MTP 12 to ensure that the subscriber DN is a valid subscriber DN authorized to use the service. The DN is also used to validate the existence of an active modem connection between the subscriber computer 35 and the DCS 50. If the DNIS information is validated, the IVRS 14 transmits a message over the signaling channel 101 to the CO 30 acknowledging and accepting the call.

In step 204, the IVRS 14 delivers call information to the MTP 12. If the existence of an active modem connection on circuit 53 was established, concurrent with acceptance of the call, the IVRS 14 delivers to the MTP 12 notification that a call has been established with the caller's telephone 441 in addition to delivering the ANI of the caller's telephone 441. The MTP 12, once again, validates the existence of a modem connection on circuit 53 between the subscriber and the DCS 50. If circuit 53 is still established, the MTP 12 sends a message by way of the DH 16 to the subscriber computer 35 over the dedicated network circuit bridging dedicated communications channels 18 and 54. This may occur through one CO 30 or by way of a plurality of COs such as CO 30 and CO 42 which are coupled together by trunk 20 as illustrated in FIG. 1. Upon acceptance of the call, a voice path is established over telephone link 10 between the caller's telephone 441 and the IVRS 14. The IVRS 14, immediately upon acceptance of the call, delivers an audio message to the caller's telephone 441, which can optionally be prerecorded by the subscriber. In the event the ANI information was not delivered from the CO 30, or is not available, the IVRS 14 can produce an audio message audible from the caller's telephone 441 requesting the caller to input their originating telephone number using a touch-tone phone. The caller entry replaces the previously absent ANI information.

In step 205, the notification message may be delivered to the subscriber computer 35. Concomitant with the delivery of the notification message, an advertising dashboard (as described with reference to a figure below) may be delivered to the subscriber computer. Alternatively, the advertising dashboard may be delivered before or after the notification message. The advertising dashboard may contain personalized messages. The advertising dashboard may have buttons to provide a hotlink to sites of personal interest to the subscriber, such as stock, weather, and news sites. The advertisement may contain hotlinks to vendor sites. Upon delivery of the notification message to the subscriber computer 35, the subscriber software residing on the subscriber's computer 35, notifies the subscriber by way of visual and audio notification. The audio notification may include a tone signal while the visual notification includes presentation of the ANI information as captured and delivered by the IVRS 14.

In the final step 206, a response is delivered to the caller's telephone 441. Upon presentation of the caller information, the subscriber can utilize a computer input device to select or input a response to be delivered to the caller's telephone 441. The input device used by the subscriber, in conjunction with the subscriber software, can select a number of pre-defined options. Each option directly correlates to a specific identifier which is delivered to the DH 16. Upon successful receipt of the identifier by the DH 16, the DH 16 delivers the identifier to the MTP 12. The MTP 12 validates the identifier and determines whether the identifier correlates to an audio message or to a call handling instruction. In the event the identifier correlates to an audio message, a signal is transmitted to the IVRS 14 from the MTP 12, which executes the delivery of a specific audio file over the voice path to the caller which is a bridging of telephone link 10 and telephone link 41 through CO 42 and 30 connected by trunk 20. If the identifier correlates to a call handling instruction, a signal is transmitted to the IVRS 14 which redirects the voice path to a voice mail system at the IVRS 14 or to another destination number on the PSTN. In the event the call handling instruction requires the voice path be redirected to the same directory number DN of the subscriber link 36 currently being utilized by the subscriber computer 35 and modem 33, the voice path between the caller's telephone 441 and the IVRS 14 is delayed from being redirected until the DCS 50 transmits a message to the DH 16 indicating that modem 33 has disconnected from the DCS 50.

The logical network elements interconnected with a subscriber or called party proxy 38 may be advantageously employed to provide an audio interactive voice response to a calling party that attempts to call a subscriber whose telephone link is busy. In the operation of a telephone system, a first caller to a subscriber's dial number is signaled to the subscriber by a ringing of the handset 341 located at the subscriber premises. A ring tone is provided to the calling party to indicate ringing of the called party's handset. Where the subscriber is already using the telephone link 36, the second caller's telephone 441 is said to be blocked and a blocking tone is provided to the second caller. This blocking tone is commonly referred to as a "busy signal" and advises the calling party that the called subscriber is using their telephone link 36 for another communication. The calling party can wait and try to call at a later time in the hope that the subscriber has made the telephone link available to receive other incoming calls.

Telephone service providers have enhanced the usability of the telephone system to provide a "call forward busy/no answer" feature to call placement within the telephone system providing an alternative to blocked calls as just described. Subscribers are provided the capability of directing callers to another telephone number in the event that their number is busy or was not answered after a preselected number of rings. When a caller using telephone 441 attempts to call a subscriber whose telephone link 36 is busy, the caller is automatically redirected to a second subscriber provided telephone number served by telephone link 10. The subscriber may provide a call forward busy/no answer number which directs blocked calls or unanswered calls to their called party proxy connected to the PSTN by telephone link 10. As can be appreciated, an embodiment of the present invention may be advantageously employed without any direct programing or installation by the telephone service provider other than to have the telephone service provider provide the capability of the "call forward busy/no answer" feature for the subscriber's telephone link. When the call forward busy/no answer feature is enabled by a subscriber, any calls directed to that subscriber's telephone number are automatically routed to the alternate dial number selected by the subscriber when activating the call forward/busy/no answer feature. Thus, a subscriber can provide the dial number corresponding to their proxy when activating the call forward busy/no answer feature whereupon subsequent callers to their dial number are automatically routed to the proxy without any further intervention from the subscriber and without any extra steps or intervention by the calling party. In the circumstances where a subscriber has activated the call forward busy/no answer feature and the subscriber is using their telephone link 36 and a second call is placed to the subscriber's dial number, the call is automatically routed to the proxy telephone link 10. Connected to proxy telephone link 10 is an IVRS 14 which receives the incoming call. The proxy has many ways of dealing with such incoming calls, as exemplified here for further clarity.

The IVRS 14 requires information about the original destination of the call to handle the incoming call properly. The original dial number destination is provided to the IVRS by the DNIS, which is a standard telephone company service. The original destination of the call is that of the subscriber that the caller intended to call but was unable to do so as the subscriber was using their telephone link 36 resulting in the caller's call being forwarded to the IVRS.

Figure 3:
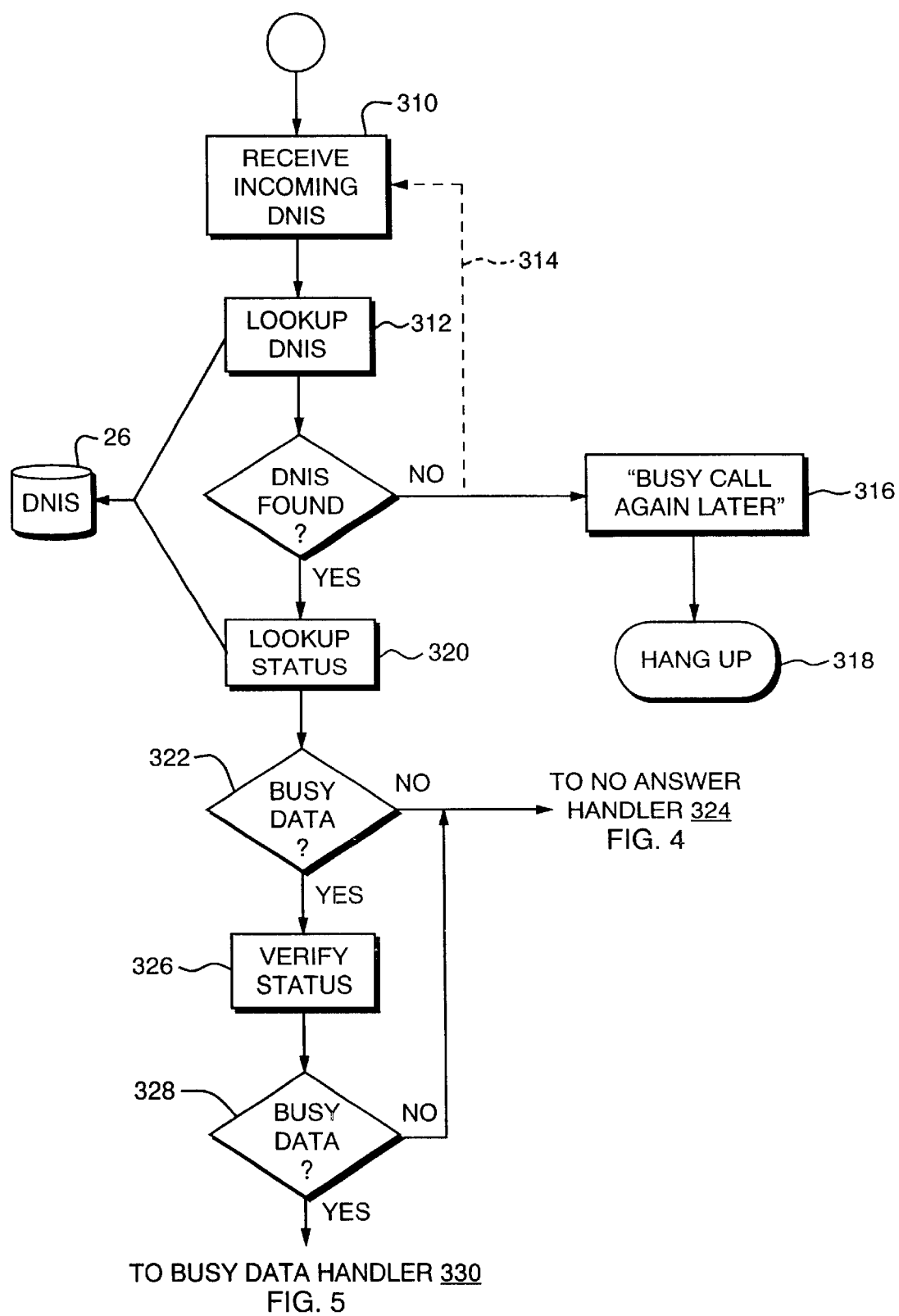
FIG. 3 is an example of a flowchart showing an incoming caller handling process.

The IVRS, serving as a proxy for the subscriber, processes the incoming call in the manner generally set out in the flowchart of FIG. 3. The subscriber's dial number is received as at 310 in accordance with the process for the DNIS. A lookup 312 of the dial number so obtained is made in the store of registered dial numbers contained within the customer record file 26 to determine if this subscriber is served by a proxy. If there is no match, the call can be ignored, that is to say the link can be left to ring and ring without answer and the IVRS simply waits for the next incoming DNIS, as shown by the upward extending dashed line 314. Alternately, a no match call may be answered (that is, go off hook and establish a communications path with the caller) using a standard audio greeting to the effect that "the called number is busy or was not answered, please try again later" as shown in box 316. The IVRS may then hang up the link to disconnect the caller as shown at 318.

If the DNIS lookup was successful, then the IVRS next looks at the particulars of the information for the subscriber as at 320. In particular, it examines the BUSY DATA status field or register 322 which is a field set to YES when the subscriber that was called is engaged in a data dialogue. The BUSY DATA field is set to NO at all other times. If the BUSY DATA status field is set YES, this brings into play the additional call handling features to process the caller's call. It should be understood that the BUSY DATA status YES/NO can be represented in any suitable manner such as 1/0, Y/N or some other such equivalence.

Where the BUSY DATA status is NO, the subscriber may, for example, be talking on the telephone or not there to answer the caller's incoming telephone call resulting in the call. In this case, indicated at 324, the proxy can process the call in the exemplary manner shown below in FIG. 4. Where the BUSY DATA status is YES, a status confirmation process 326 is preferably initiated to confirm that the subscriber is still engaged in the data dialogue. The proxy MTP initiates the confirmation process by having the proxy data handler send an enquiry message over the data network, such as the Internet, to the subscriber's computer. The subscriber's computer may automatically without user intervention prepare a response confirmation message for routing back to the proxy data handler. When the proxy data handler sends an enquiry data message, the response confirmation message may be received within a preselected time limit 328. This confirmatory process 326 and 328 is intended to ensure that the YES status wasn't simply left over from a previous computer dialogue session or otherwise in error. Confirmation of the BUSY DATA status results in a busy data handler process 330 which is described below with reference to FIG. 5. In the event that the confirmatory process message exchanges did not successfully complete, the caller is routed to the Busy/No Answer process 324, which is described below with reference to FIG. 4.

Figure 4:
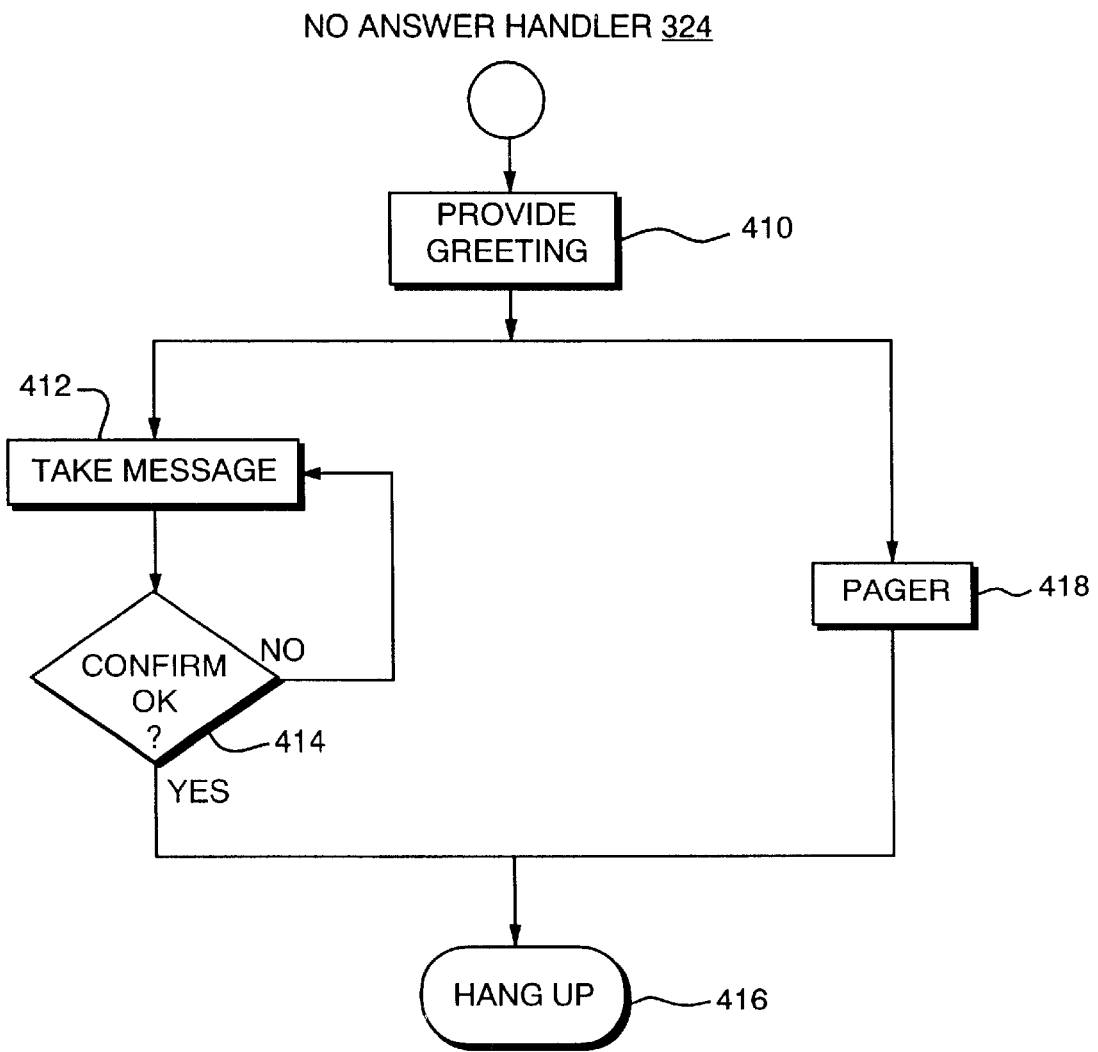
FIG. 4 is an example of a flowchart showing a no answer handler process.

Referring to FIG. 4, a flowchart is shown that is relevant when BUSY DATA status is NO. The proxy may then process the call in a manner similar to an answering machine function and may simply provide a greeting as at 410 ("Hi, I'm on the phone or unable to take your call right now, please leave a massage . . . ") and take a message 412 from the caller. The exemplary call processing flowchart of FIG. 4 has the additional optional step of interrogating the caller at the conclusion of the message to obtain confirmation that the caller is satisfied with the message and give the caller the opportunity to record a replacement message if the first was not satisfactory. This is shown at 414. Once the message has been taken, the telephone call is terminated by the proxy simply hanging up the link 416.

Optionally and by way of further example, the subscriber may have a pager service that may be accessible to callers. Where the subscriber has such a service, the caller may be greeted as at 410 and provided with the option to contact the subscriber via a pager ("Hi, I'm on the phone or unable to take your call right now, please leave a message to have me paged"). A pager contact process 418 for the caller is then initiated.

Figure 5:
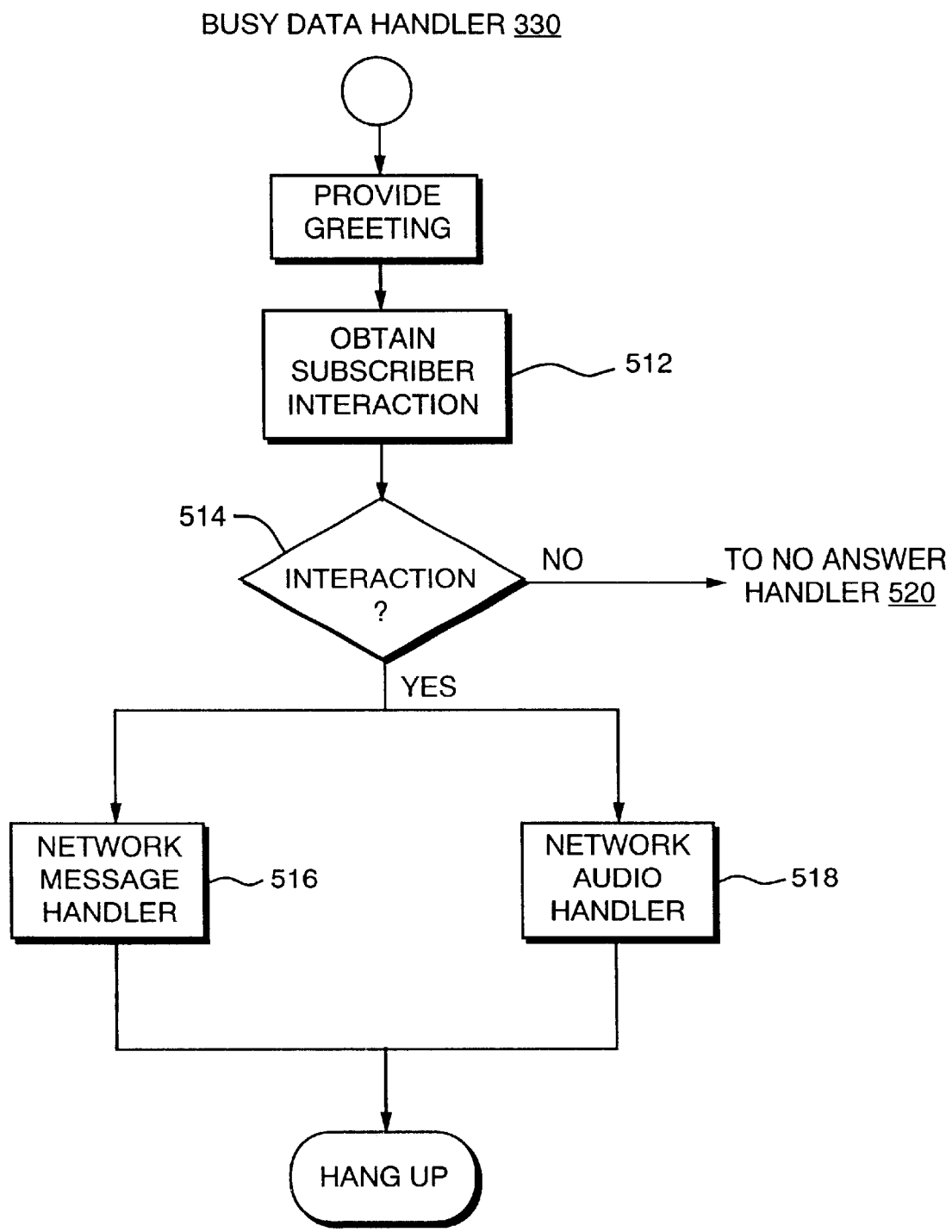
FIG. 5 is an example of a flowchart showing a caller handler process where the called subscriber is occupying the telephone link on a data network call.

Referring to FIG. 5, a flowchart is presented for the BUSY DATA process to which the caller is routed to when the called subscriber is active in a data use of the subscriber's telephone link. In such a communications state, the blocked caller routed to the subscriber's proxy is now provided with many more options for contacting the subscriber. The proxy call handling process may include message and pager options for the caller described above with reference to FIG. 4, and delivery of notification messages to the subscriber to obtain interaction from the subscriber as shown at 512. The notification messages are delivered over the data network, such as the Internet, on a real time basis to the subscriber's computer.

The notification messages received at the subscriber's computer may be processed by the subscriber's computer in several different ways. The subscriber's computer can process the notification message into a visually perceptible message for display on the subscriber's computer screen. The visually perceptible message indicates that a telephone caller has been routed to the proxy. The subscriber's computer can additionally process the notification message by initiating an audio notification aurally perceptible by the subscriber. The audio notification may be a simple ringing, chiming or tone signal and can be combined with the visually perceptible message.

Upon perception of the presence of a caller interacting with the subscriber's proxy, the subscriber can take one of several steps. The subscriber can take no action and the proxy data handler is not then able to provide the MTP with a subscriber response message as indicated at 514. The MTP processes the lack of notification of subscriber instructions from the subscriber's computer as an indication that the subscriber is not at that time interacting with the computer and is therefore unable to provide instructions or messages to the proxy for dealing with the caller. The proxy MTP then defaults to the no answer handler as shown at 520 to take a message from the caller in the same fashion as described previously with reference to FIG. 4.

If the subscriber does interact with his or her computer to direct messages over the data network, such as the Internet, to the proxy data host, these are acted upon by the proxy to provide audio messages instructing the caller. For example, the subscriber may decide to disconnect the computer from the telephone link to free up the telephone link to receive incoming calls. The subscriber may interact with his or her computer to input this intention to the computer which may forward a message to that effect over the data network or Internet to the proxy as at 516, 518.

Upon receipt of such a message, the proxy IVRS may provide an audio message to the caller, for example "I am going to free up my telephone line in just a few moments, please hang up this call and call again to speak to me directly." Thus, the caller is able to initiate another call to the subscriber. Another more convenient and preferred method of handling the call may be to have the IVRS transfer the call from the caller to the subscriber when the subscriber's line is free. This step can be done by having the IVRS wait a predetermined time, such as 15 seconds, to allow the subscriber time to disconnect and free up the line to receive the transferred called. Alternately, instead of the proxy waiting a predetermined time such as 15 seconds, the subscriber's PC may be configured to repeatedly send notification messages to the proxy at short predetermined time intervals, such as every two seconds. When the notification messages stop arriving at the proxy, that condition may indicate that the subscriber has disconnected and is ready to accept transfer of the call.

In another option, the subscriber's computer can be configured to include a voice audio input path such as a microphone 22 and voice audio output path such as headphones 24 or speakers connected to suitable equipment within the computer such as a sound card. To process voice signaling, the subscriber's computer 35 may require an Internet telephone system program capable of delivering messages carrying digital message representations of a voice conversation over the Internet. Such software programs are available and include Webphone™ by way of example. The proxy IVRS may be similarly equipped with the necessary software and hardware to interconnect the caller with the sound equipment of the proxy. The subscriber may input commands into his or her computer indicating an intention to carry out a telephone conversation over the Internet using the Webphone™ software and messages to that effect may be transmitted to the proxy to establish the necessary data path and interconnections as at 516, 518 to have the caller bridged to the subscriber over a message path capable of carrying a voice conversation between the caller and the subscriber ail without disconnecting the subscriber from the data services he or she was using. To inform the caller of the subscriber's intention to set up an audio bridg over the Intrenet, the proxy might provide an informational audio message to the caller to keep the caller on the telephone long enough for the necessary setups to occur. An example audio message produced by the proxy while the setup is occurring might be "Just a moment while I set up my telephone to speak with you please."

Figure 6:
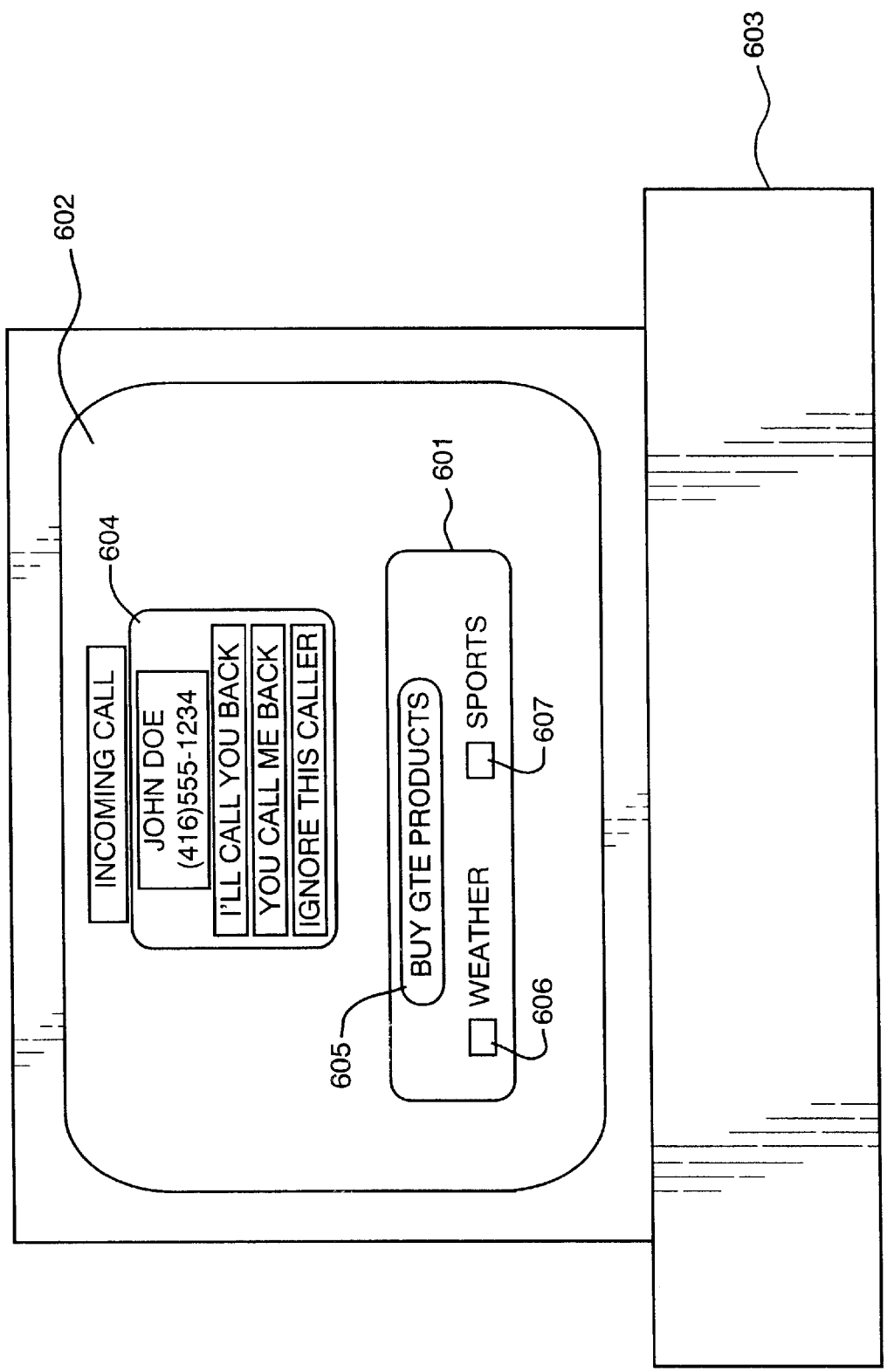
FIG. 6 is an example of a computer screen displaying an Internet Call Manager message, and an advertising dashboard.

Referring to FIG. 6, an advertising dashboard 601 is presented on a display 602 of a computer 603. A subscriber uses the computer 603 to log onto the Internet via communication software. Also shown on the display 602 is an Internet Call Manager notification message 604 alerting the subscriber to an incoming call. In this example, the notification message 604 and advertising dashboard 601 appear simultaneously on the screen and are separated. It should be understood that this is but one possibility amongst other ones. For example, the message 604 may precede or follow the advertising dashboard 601. Also, the message 604 and dashboard 601 may be connected and share a common boundary. On the dashboard 601 appears an advertisement banner 605, and two hotlinks 606, 607 to a weather site and sports site, respectively. Personalized messages, such as scores of the subscriber's favorite sports team, may also be included.

Advertising on the Internet may preferably be quickly downloaded and immediately accessible at the click of a mouse. To achieve these two features, the advertising dashboard appearing with ICM or UM may consist of a modified version of the ICM or UM clients which, upon connection of the subscriber to the Internet, may download the requisite banners for that subscriber (those banners being, of course, demographically targeted). Thus there may be no delay in delivering the ICM or UM screen pop. Instead, once the screen pop is generated, the banners may pop onto the subscriber's screen.

For an ICM service offering call answer, the pop-up screen with advertising banners may remain open during the call to give the subscriber additional exposure to the advertising content.

While the foregoing detailed description has involved an Internet Call Manager, it is understood that many other services that arrive to the subscriber for a fee are amenable to the present invention. Other examples include online magazine subscriptions, stock tracking and analysis, and Internet access itself. By pushing advertising dashboards to the subscriber, advertising revenues may help defray the cost of these Internet services, perhaps to the point where they may thus be offered to the subscriber for free. In one example, the subscriber may provide personal information upon subscribing to the Internet service. This information may then be used to create highly targeted advertisements. Such advertising dashboards may be more attractive to the subscriber because of the inclusion of personalized messages, and hotlinks.

While the preceding examples involve Internet services, it is understood that other types of services may be amenable to the present invention. For example, a subscription to a newspaper delivered to the subscriber's doorstep may be a focus of an embodiment of the present invention. In return for interrupting Internet sessions with a targeted and personalized advertising dashboard pushed to the subscriber, the subscription rate charged to a subscriber may be reduced.

Moreover, it is also understood that the subscriber need not be on the Internet to push the advertising dashboard to him or her. Instead, any IP-based network, such as an Intranet, for example, can serve to deliver the advertising dashboard to a subscriber.

In another embodiment, the subscriber need not be using a computer to receive the advertising dashboard, but instead may be using any device capable of communicating the advertising dashboard to the subscriber. Such a device may be defined as a communicator. A television having intelligent components to be able to push a targeted advertising dashboard to the subscriber is an example of a communicator utilized in one embodiment of the invention. The advertising dashboard may be targeted by making use of personal information supplied by the subscriber. The incentive for the subscriber to provide such information includes a reduction in the cost charged to the subscriber for receiving a service, such as cable television, or DIRECTV™. The television set itself may be offered to the subscriber at a reduced price in return for pushing the advertising dashboard.

Figure 7:
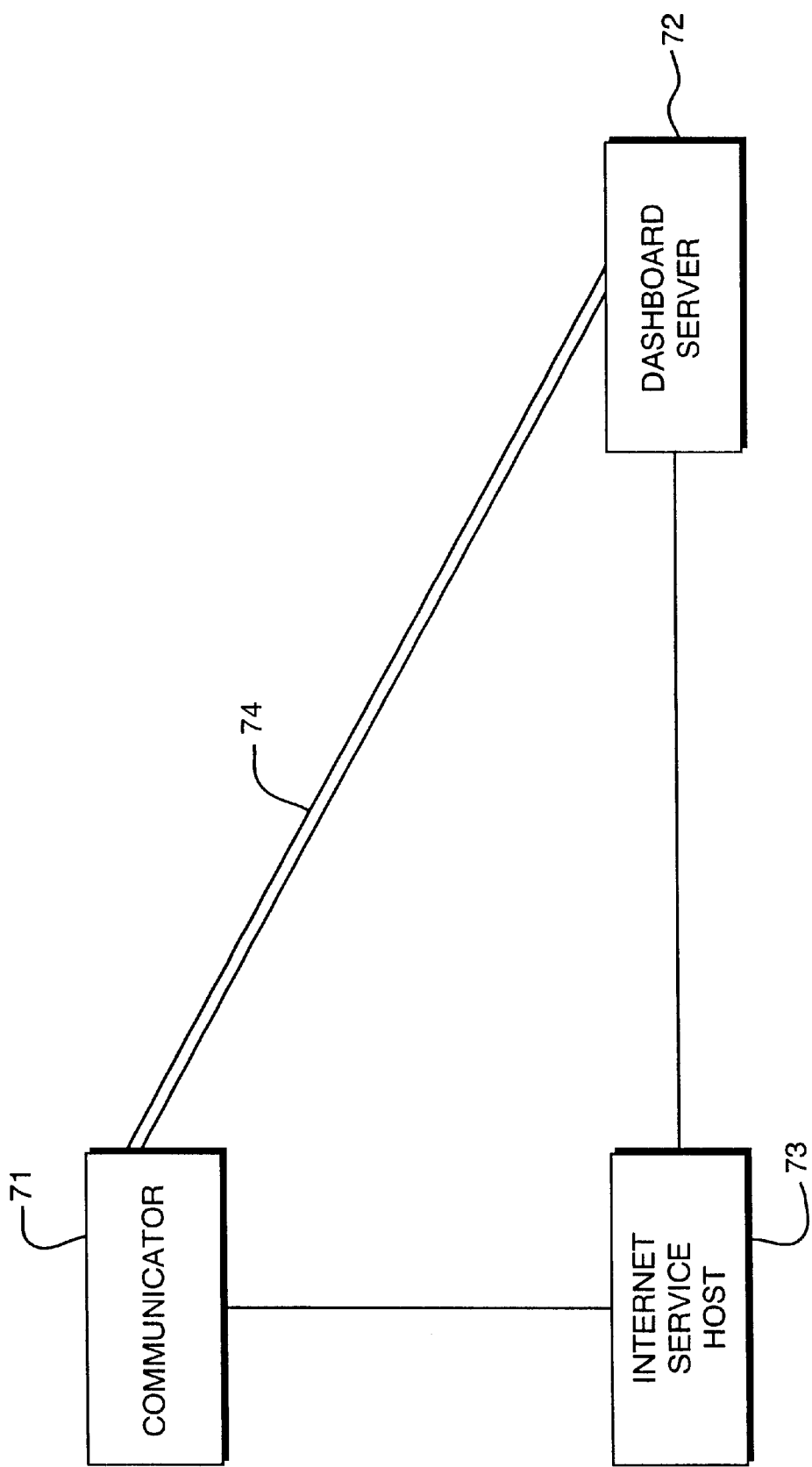
FIG. 7 is an example of a schematic of a communicator for receiving an advertising dashboard using data supplied by a dashboard server connected to an Internet service host.

In FIG. 7 is shown an example of a schematic of a communicator 71, such as a computer, television, H.323 phone, pager, and radio, for receiving an advertising dashboard using data supplied by a dashboard server 72 connected to an Internet service host 73. The communicator 71 is connected to the dashboard server 72 by a connector 74. The communicator 71 exchanges information with the Internet service host 73. The exchange of information between the communicator and the Internet service host 73 may occur via a dial-up, local area network (LAN), asymmetric digital subscriber line (ADSL), cable, or wireless connection, for example. The Internet service host 73 may notify the dashboard server 72 that a particular subscriber at a certain IP address is online. The dashboard server 72 may provide the communicator 71 with cached data to display an advertising dashboard. The dashboard server 72 may update these data periodically. The communicator 71 may display the advertising dashboard according to instructions received from the dashboard server 72.

Various modifications and improvements thereon are readily apparent to those skilled in the art. Accordingly, the spirit and scope of the present invention are to be limited only by the following claims.

What is claimed is:

1. A method of defraying a cost of an Internet service provided to a subscriber comprising:
   providing a dashboard wherein notifying the subscriber of an event comprises notifying the subscriber of an incoming telephone call, fax, email or page server that is connected to a computer of the subscriber;
   notifying the subscriber of an event;
   in connection with notifying the subscriber of the event, pushing an advertising dashboard to a display of the computer by interrupting an Internet session on the computer, and by using data provided by the dashboard server;
   on the advertising dashboard, providing information to the subscriber; and
   to defray the cost of the Internet service, providing an advertisement on the advertising dashboard.

2. A method as in claim 1, wherein pushing an advertising dashboard to a display of the computer by interrupting an Internet session on the computer includes pushing an advertising dashboard to a display of the computer by a synchronously interrupting an Internet session on the computer.

3. A method as in claim 1, wherein pushing an advertising dashboard to a display of the computer by interrupting an Internet session on the computer includes pushing an advertising dashboard to a display of the computer by synchronously interrupting an Internet session on the computer.

4. The method of claim 1, wherein providing information includes providing a hotlink to a web page.

5. The method of claim 4, wherein the web page includes one of a stocks site, weather site, sports site, news site, local information site, travel site, shopping site, and games site.

6. The method of claim 4, wherein the web page includes at least one of an advertisement banner and a link to another web page.

7. The method of claim 1, wherein providing information includes providing information relating to at least one of weather, stocks, sports, local interests, travel, shopping, and news.

8. The method of claim 1, wherein providing information includes providing personalized information that is preselected by the subscriber.

9. The method of claim 1, further comprising:
   obtaining personal data from the subscriber; and
   to defray the cost of the Internet service, providing an advertisement on the advertising dashboard that is targeted to the subscriber according to the personal data.

10. The method of claim 9, wherein personal data includes at least one of education, salary, sex, interests, hobbies, and address of the subscriber.

11. The method of claim 1, further comprising storing data for the advertising dashboard in a cache on the computer.

12. The method of claim 1, wherein pushing an advertising dashboard to a display of the computer by interrupting an Internet session on the computer, and by using data provided by the dashboard server includes downloading the data provided by the dashboard server to the computer as soon as the subscriber is engaged in the Internet session on the computer.

13. A system for defraying a cost of an Internet service provided to a subscriber comprising:
   a dashboard wherein notifying the subscriber of an event comprises notifying the subscriber of an incoming telephone call, fax, email or page server connected to a computer of the subscriber;

machine executable instructions for the server and the computer for notifying the subscriber of an event;

machine executable instructions for the server and the computer for pushing, in connection with notifying the subscriber of the event, an advertising dashboard to a display of the computer by interrupting an Internet session;

a hotlink to a web page displayed on the advertising dashboard; and to defray the cost of the Internet service, an advertisement displayed on the advertising dashboard.

14. A method of defraying a cost of an Internet service provided to a subscriber comprising providing a dashboard wherein notifying the subscriber of an event comprises notifying the subscriber of an incoming telephone call, fax, email or page server that is connected to a computer of the subscriber;

notifying the subscriber of an event;

while the subscriber is engaged in an Internet session on the computer, and in connection with notifying the subscriber of the event, pushing an advertising dashboard to a display of the computer by interrupting the Internet session;

on the advertising dashboard, providing information to the subscriber; and to defray the cost of the Internet service, providing an advertisement on the advertising dashboard.

15. The method of claim 14, wherein providing information includes providing a hotlink to a web page.

16. The method of claim 15, wherein the web page includes one of a stocks site, weather site, sports site, news site, local information site, travel site, shopping site, and games site.

17. The method of claim 15, wherein the web page includes at least one of an advertisement banner and a link to another web page.

18. The method of claim 14, wherein providing information includes providing information relating to at least one of weather, stocks, sports, local interests, travel, shopping, and news.

19. The method of claim 14, wherein providing information includes providing personalized information relating to a topic that is preselected by the subscriber.

20. The method of claim 14, further comprising obtaining personal data from the subscriber; and providing an advertisement on the advertising dashboard that is targeted to the subscriber according to the personal data.

21. The method of claim 20, wherein personal data includes at least one of education, salary, sex, and address of the subscriber.

22. The method of claim 14, further comprising storing data for the advertising dashboard in a cache on the computer.

23. The method of claim 14, wherein pushing an advertising dashboard includes downloading data for the dashboard to the computer as soon as the subscriber is engaged in an Internet session on the computer.

24. A system for defraying a cost of an Internet service provided to a subscriber comprising a dashboard wherein notifying the subscriber of an event comprises notifying the subscriber of an incoming telephone call, fax, email or page server connected to a computer of the subscriber;

machine executable instructions for the server and the computer for notifying the subscriber of an event;

machine executable instructions for the server and the computer for delivering, in connection with notifying the subscriber of the event, data to the computer for an advertising dashboard pushed to the subscriber by interrupting an Internet session;

a hotlink to a web page displayed on the advertising dashboard; and to defray the cost of the Internet service, an advertisement displayed on the advertising dashboard.

25. A method of defraying a cost of a service provided to a subscriber wherein notifying the subscriber of an event comprises notifying the subscriber of an incoming telephone call, fax, email or page said service capable of delivering a message to the subscriber via a communicator, comprising providing a dashboard server that is connected to the communicator;

notifying the subscriber of an event;

while the subscriber is engaged in a session of the service, and in connection with notifying the subscriber of the event, pushing an advertising dashboard to the communicator by interrupting the session; and to defray the cost of the service, providing an advertisement on the advertising dashboard, wherein the advertisement is targeted to the subscriber by using personal information supplied by the subscriber.

26. A method as in claim 25, wherein the advertising dashboard includes information ted to a topic preselected by the subscriber.

27. A method as in claim 25, wherein the communicator is a television.

28. A method as in claim 25, wherein the communicator is a computer.

29. A system for defraying a cost of a service provided to a subscriber wherein notifying the subscriber of an event comprises notifying the subscriber of an incoming telephone call, fax, email or page comprising a communicator for delivering a message to the subscriber;

a dashboard server connected to the communicator;

machine executable, instructions for the server and the communicator for notifying the subscriber of an event;

machine executable instructions for the server and the communicator for delivering, in connection with notifying the subscriber of an event, data to the communicator for an advertising dashboard pushed to the subscriber by interrupting a session of the service; and to defray the cost of the service, an advertisement displayed on the advertising dashboard, wherein the advertisement is targeted to the subscriber by using personal information supplied by the subscriber.

30. A system as in claim 29, wherein the advertising dashboard includes information related to a topic preselected by the subscriber.

31. A server for pushing an advertising dashboard to a subscriber by an asynchronous interrupt comprising a connector for connecting the server to a communicator, wherein notifying the subscriber of an event comprises notifying the subscriber of an incoming telephone call, fax, email or page said communicator capable of delivering a message to the subscriber;

machine-executable instructions for said server and said communicator for notifying the subscriber of an event;

machine-executable instructions for said server for selecting data for the advertising dashboard, said advertising dashboard including an advertisement that is targeted to the subscriber by utilizing personal information of the subscriber, said advertisement defraying the cost of a service provided to the subscriber;

machine-executable instructions for said server and said communicator permitting, in connection with notifying the subscriber of said event, the advertising dashboard to be pushed to the subscriber via the communicator.

32. A server as in claim 31, wherein the communicator is a computer.

33. A server as in claim 31, wherein the communicator is a television.

* * * * *